United States Patent [19]

Nguyen

[11] Patent Number: 4,915,285

[45] Date of Patent: Apr. 10, 1990

[54] APPARATUS FOR MAKING A DIAPHRAGM ASSEMBLY AND METHOD OF MAKING THE APPARATUS

[76] Inventor: Ledu Q. Nguyen, 109 Stan Ave., New Stanton, Pa. 15672

[21] Appl. No.: 378,751

[22] Filed: Jul. 12, 1989

Related U.S. Application Data

[62] Division of Ser. No. 239,548, Sep. 1, 1988, Pat. No. 4,863,092.

[51] Int. Cl.⁴ .......................... B23K 1/12; B23K 31/02
[52] U.S. Cl. ...................................... 228/212; 228/47; 29/281.4
[58] Field of Search ...................... 228/902, 102, 41, 8, 228/33, 35, 47, 212; 901/42; 29/430, 792, 281.4, DIG. 4

[56] References Cited

U.S. PATENT DOCUMENTS 3,765,591 10/1973 Cook ..................................... 228/37

FOREIGN PATENT DOCUMENTS 112736 8/1980 Japan ..................................... 29/792
724364 4/1988 U.S.S.R. ............................... 29/792

*Primary Examiner*—Nicholas P. Godici
*Assistant Examiner*—Samuel M. Heinrich
*Attorney, Agent, or Firm*—Candor, Candor & Tassone

[57] ABSTRACT

An apparatus for automatically brazing the opposed ends of a capillary tube respectively to connecting parts of a bulb and a diaphragm unit and a method of making the apparatus are provided, the apparatus comprising a rotatable table and a plurality of work stations disposed in spaced apart relation about the table and each having an operating device, the table having a plurality of fixtures each being adapted to hold an assembly of the bulb and diaphragm unit in a fixed relation relative to each other with the capillary tube assembled to the connecting parts thereof, the table being adapted to index through the work stations so that the devices at the work stations can each perform its specific operation on the respective assembly disposed at that particular station during a predetermined dwell time in the movement of the table, the device of one of the station comprising a movable arm for applying a flux to the assembly, the device of another of the stations comprising a movable arm for preheating each assembly in an area thereof that is to be brazed, the device of still another of the stations comprising a movable arm for soldering each assembly at the connecting parts thereof so that the ends of the capillary tube are respectively brazed to the connecing parts of the bulb and the diaphragm unit thereof, each device having structure that is adapted to move its arm thereof from an out position to an in position so as to perform its operation on the assembly disposed at its respective work station, the moving structure of each device being adapted to move its respective arm from its out position to its in position in a substantially straight-line manner.

20 Claims, 14 Drawing Sheets

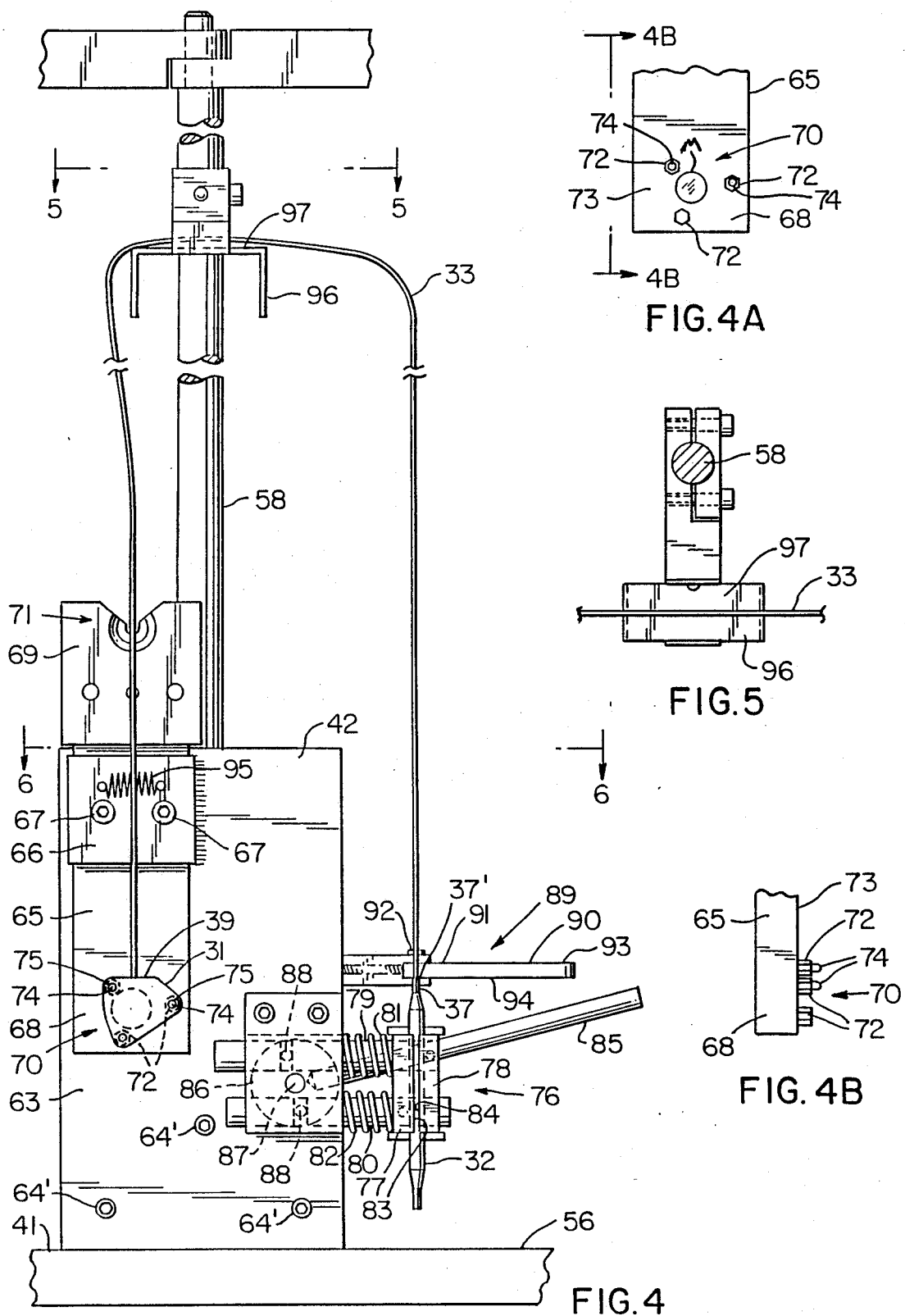

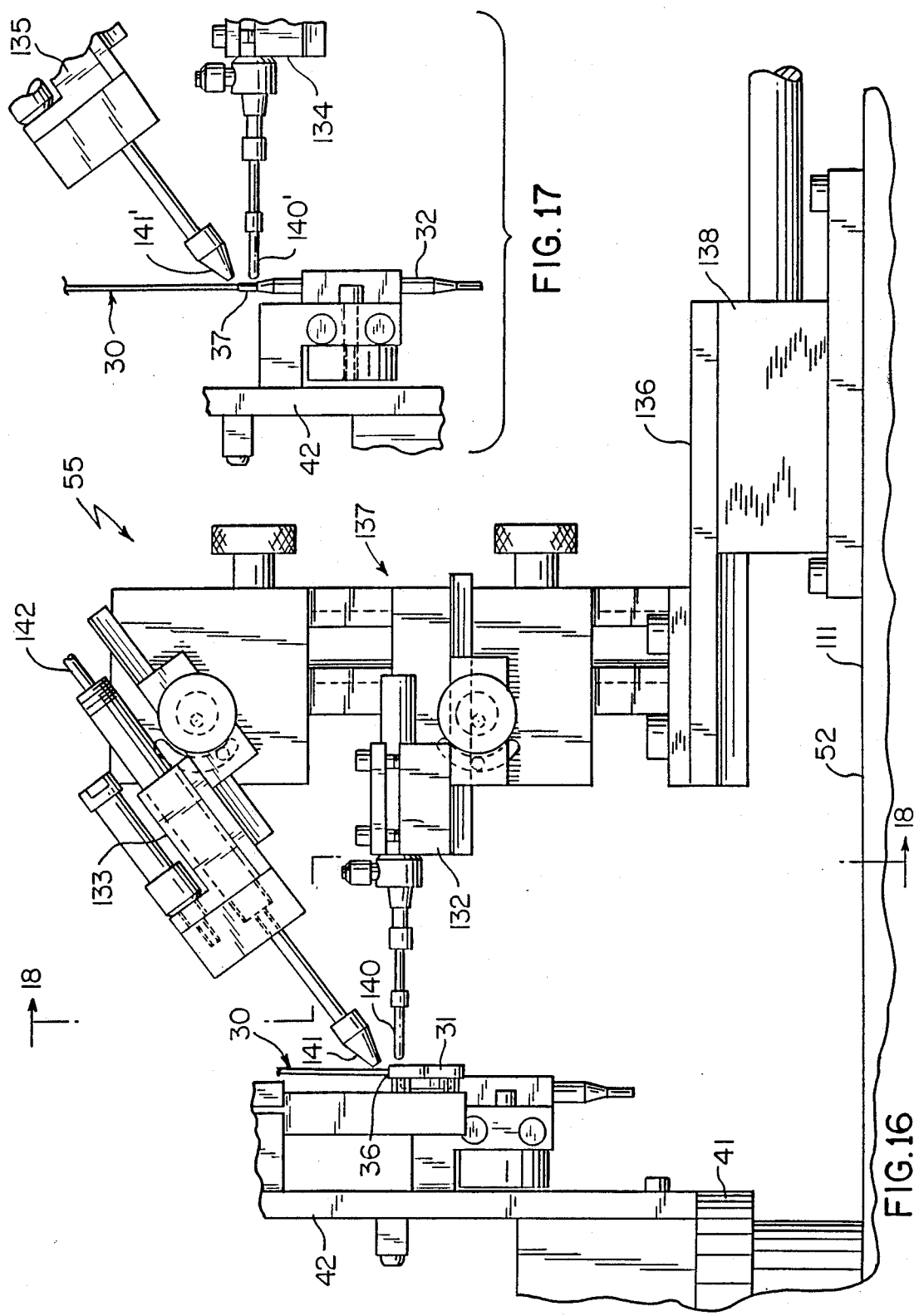

APPARATUS FOR MAKING A DIAPHRAGM ASSEMBLY AND METHOD OF MAKING THE APPARATUS

CROSS REFERENCE TO RELATED APPLICATION

This application is a divisional patent application of its copending parent patent application, Ser. No. 239,548, filed Sept. 1, 1988, now U.S. Pat. No. 4,863,092.

BACKGROUND OF THE INVENTION

1. Field of the Invention

This invention relates to a new apparatus for automatically brazing the opposed end means of a capillary tube respectively to connecting parts of a bulb and a diaphragm means as well as to a new method of making such an apparatus.

2. Prior Art Statement

It is known to provide an apparatus for automatically brazing the opposed end means of a capillary tube respectively to connecting parts of a bulb and a diaphragm means, the apparatus comprising a rotatable table having a plurality of work stations disposed in spaced apart relation about the table and each having an operating device, the table having a plurality of fixture means each being adapted to hold an assembly of the bulb and diaphragm means in a fixed relation relative to each other with a capillary tube assembled to the connecting parts thereof, the table having means to index the table through the work stations so that the devices at the work stations can each perform its specific operation on the respective assembly disposed at that particular station during a predetermined dwell time in the movement of the table, the device of one of the stations comprising a movable arm means for applying a flux means to each assembly, the device of another of the stations comprising a movable arm means for preheating each assembly in an area thereof that is to be brazed, the device of still another of the stations comprising a movable arm means for soldering each assembly at the connecting parts thereof so that the end means of the capillary tube are respectively brazed to the connecting parts of the bulb and the diaphragm means thereof, each device having moving means that is adapted to move its arm means thereof from an out position to an in position so as to perform its operation on the assembly disposed at its respective work station.

The arm means of such prior known apparatus are each pivotally mounted so that the same are moved in an arcuate manner from its out position to its in position through a plane that is disposed substantially transverse to the plane through which the table moves.

SUMMARY OF THE INVENTION

It is one feature of this invention to provide a new apparatus for automatically brazing the opposed end means of a capillary tube respectively to connecting parts of a bulb and a diaphragm means by moving the arm means of the devices that perform the operating functions in such a manner that the same more accurately perform their operating functions than the prior known apparatus.

In particular, it was found according to the teachings of this invention that the prior known apparatus has each arm means thereof pivotally mounted so that the same is moved through an arcuate path in a plane that is disposed substantially transverse to the plane of movement of the table carrying the assemblies to be operated on so that the arm means tends to bounce at its in position thereof so that an accurate operation thereof cannot be provided.

However, it was found according to the teachings of this invention that such adverse bouncing could be completely eliminated if the arm means were uniquely arranged so that the same would move substantially in a straight-line manner from their out positions to their in positions whereby the resulting operations thereof are more accurately performed.

For example, one embodiment of this invention provides an apparatus for automatically brazing the opposed end means of a capillary tube respectively to connecting parts of a bulb and a diaphragm means, the apparatus comprising a rotatable table and a plurality of work stations disposed in spaced apart relation about the table and each having an operating device, the table having a plurality of fixture means each being adapted to hold an assembly of the bulb and diaphragm means in a fixed relation relative to each other with its capillary tube assembled to the connecting parts thereof, the table having means to index the table through the work stations so that the devices at the work stations can each perform its specific operation on the respective assembly disposed at that particular station during a predetermined dwell time in the movement of the table, the device of one of the stations comprising a movable arm means for applying a flux means to each assembly, the device of another of the stations comprising a movable arm means for preheating each assembly in an area thereof that is to be brazed, the device of still another of the stations comprising movable arm means for soldering each assembly at the connecting parts thereof so that the end means of the capillary tube are respectively brazed to the connecting parts of the bulb and the diaphragm means thereof, each device having moving means that is adapted to move its arm means thereof from an out position to an in position to perform its operation on the assembly disposed at its respective work station, the moving means of each device being adapted to move its respective arm means from its out position to its in position in a substantially straight-line manner.

Accordingly, it is an object of this invention to provide a new apparatus for automatically brazing the opposed end means of a capillary tube respectively to connecting parts of a bulb and a diaphragm means, the apparatus of this invention having one or more of the novel features of this invention as set forth above or hereinafter shown or described.

Another object of this invention is to provide a new method of making such an apparatus, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 4 is an enlarged fragmentary front view of the apparatus of FIG. 3 and is taken in the direction of the arrows 4—4 of FIG. 3, FIG. 4 illustrating the parts of FIG. 2 after the same have been assembled into the holding fixture means of the apparatus and before the parts thereof have been brazed together.

FIG. 4A is a fragmentary view of the part of the fixture means of FIG. 4 that holds the diaphragm means with the diaphragm means removed.

FIG. 4B is a side view of the structure illustrated in FIG. 4A and is taken in the direction of the arrows 4B—4B thereof.

FIG. 5 is a fragmentary cross-sectional view taken on line 5—5 of FIG. 4.

FIG. 16 is a fragmentary cross-sectional view taken on line 16—16 of FIG. 15.

FIG. 17 is a fragmentary cross-sectional view taken on line 17—17 of FIG. 15.

DESCRIPTION OF THE PREFERRED EMBODIMENTS

Figure 1:
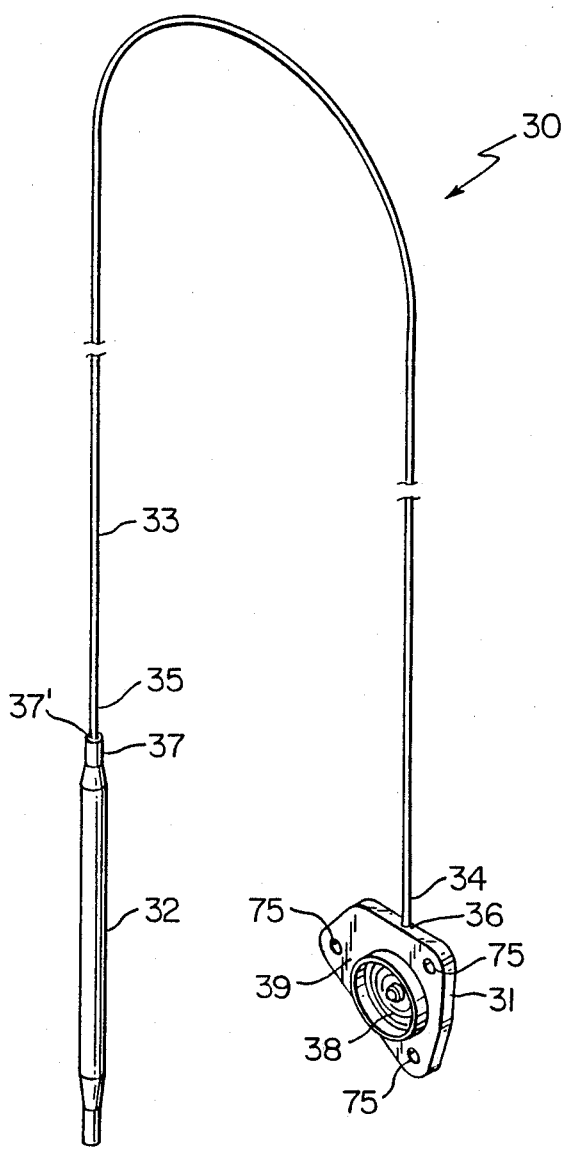
FIG. 1 is a perspective view of one diaphragm assembly that can be made by the apparatus of this invention.

While the various features of this invention are hereinafter illustrated and described as being particularly adapted to braze the connecting parts of particular diaphragm assembly structures, it is to be understood that the various features of this invention can be utilized singly or in various combinations thereof to provide an apparatus for brazing other types of diaphragm assemblies as desired.

Therefore, this invention is not to be limited to only the embodiments illustrated in the drawings, because the drawings are merely utilized to illustrate some of the wide variety of uses of this invention.

Referring now to FIG. 1, the diaphragm assembly that is made by the apparatus of this invention is generally indicated by the reference numeral 30 and comprises a diaphragm means 31, a bulb 32 and a capillary tube 33 having opposed end means 34 and 35 respectively brazed or soldered to connecting parts 36 and 37 of the diaphragm means 31 and bulb 32 whereby a fluid contained in the bulb 32 is adapted to expand upon an increase of the temperature being sensed by the bulb 32 and thereby cause a movable wall 38 of the diaphragm means 31 to move outwardly relative to a base surface 39 thereof because the capillary tube 33 conveys the expanding fluid from the bulb 32 to a space between the diaphragm 38 and the base surface 39. Thus, the expanding fluid moves the wall 38 outwardly in a manner well known in the art for diaphragm assemblies. Conversely, when the temperature being sensed by the bulb 32 decreases, the fluid in the system contracts and thereby permits the diaphragm 38 to move closer to the base surface 39.

While there are many uses for diaphragm assemblies, one such use is to utilize the same in temperature responsive controls in a manner that is well known in the art.

Figure 2:
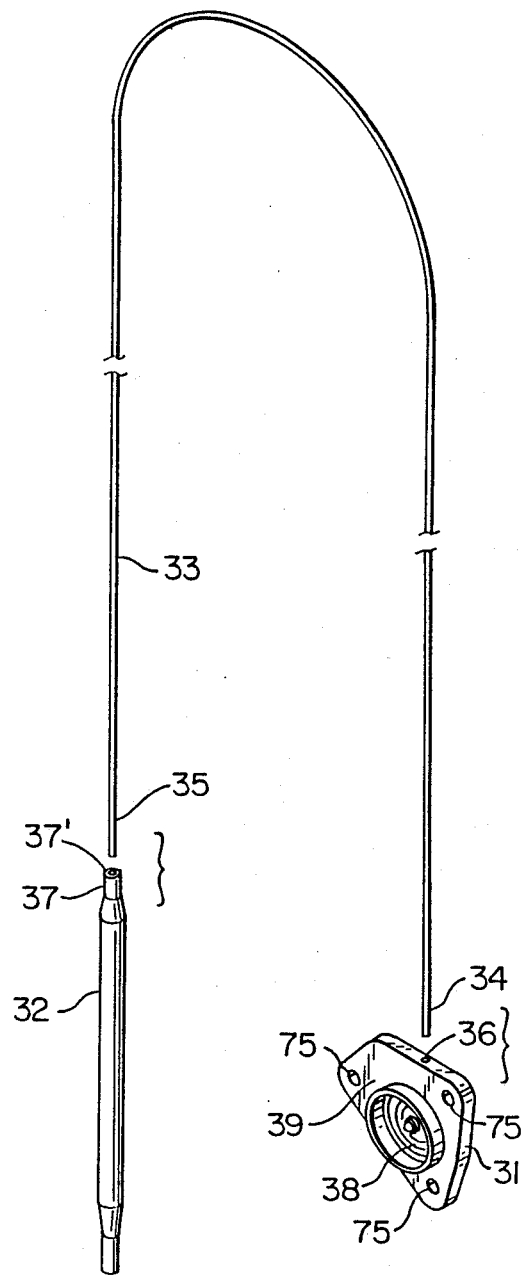
FIG. 2 is an exploded perspective view of the three parts that form the diaphragm assembly of FIG. 1.

As illustrated in FIG. 2, the diaphragm assembly 30 initially has the three parts 31, 32 and 33 thereof formed separately from each other whereby the end means 34 of the capillary tube 33 must be inserted into the connecting opening or part 36 of the diaphragm means 31 and be brazed or soldered therein in order to permanently fluidly interconnect the capillary tube 33 thereto. Similarly, the other end means 35 of the capillary tube 33 must be inserted in the opening or connecting part 37 of the bulb 32 and be secured therein in a like manner in order to permanently fluidly interconnect the bulb 32 to the diaphragm means 31 through the capillary tube 33.

Figure 3:
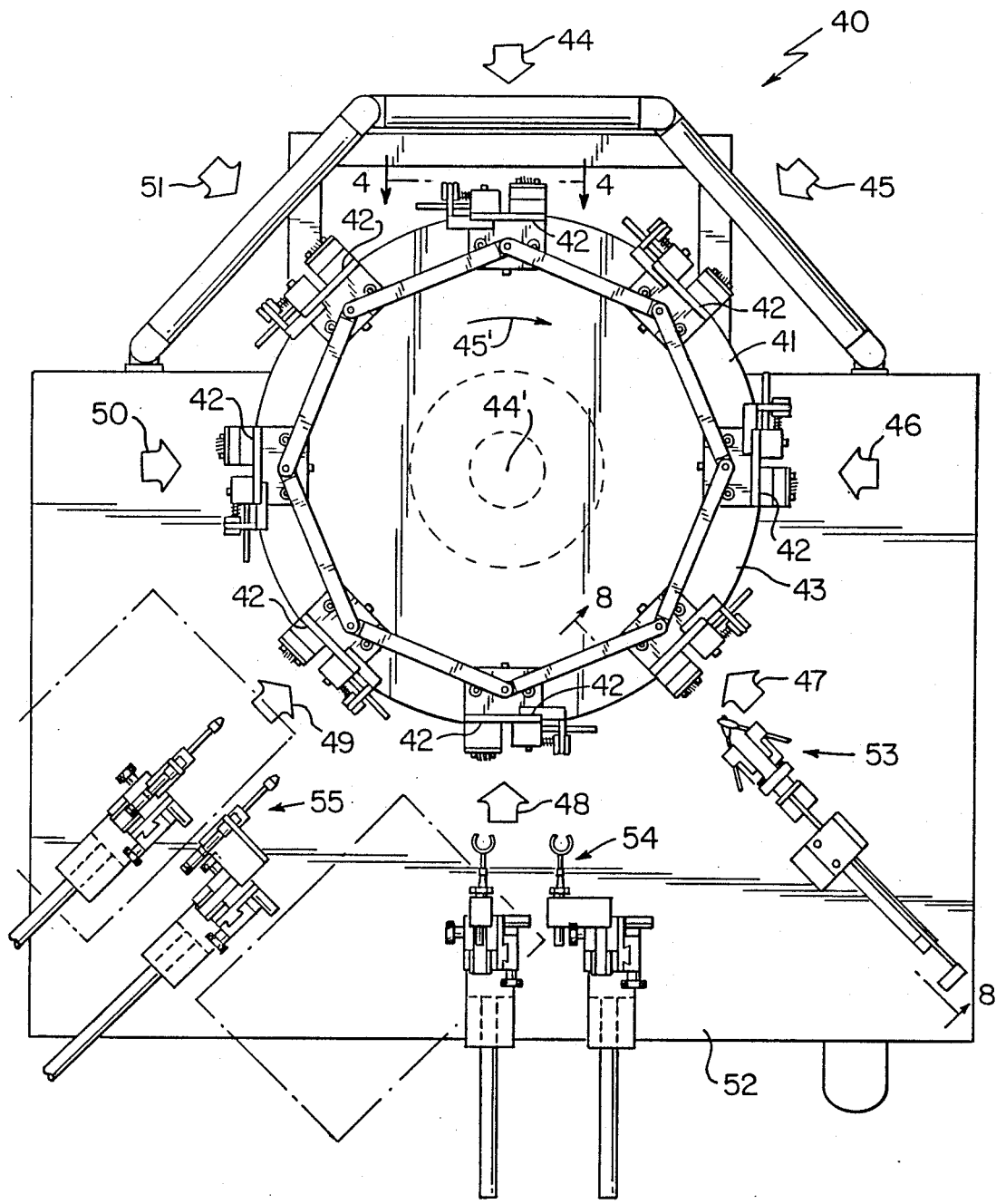
FIG. 3 is a fragmentary top view of the apparatus of this invention for making the assembly of FIG. 1, the apparatus of FIG. 3 having the arm means of the various devices thereof in their out position so that the table can be moved in an indexing manner.

The apparatus of this invention for brazing or soldering the end means 34 and 35 of the capillary tube 33 in the connecting means 36 and 37 of the diaphragm means 31 and bulb 32 is generally indicated by the reference numeral 40 in FIG. 3 and comprises a rotatable table 41 having a plurality of like fixture means 42 fastened thereon in spaced apart relation about an outer peripheral portion 43 of the table 41 that is adapted to be intermittently rotated about an axis 44' in the clockwise direction as represented by the arrow 45' by suitable drive means (not shown) that will cause the table 41 to index each fixture means 42 through a plurality of work stations that are respectively disposed outboard of the outer peripheral means 43 of the table 41 and are respectively represented by the arrows 44, 45, 46, 47, 48, 49, 50 and 51 whereby each fixture means 42 will be temporarily positioned at each work station for a particular dwell time in the movement of the table in a manner well known in the art.

The apparatus 40 also includes a stationary table or support means 52 that support operating devices that are generally indicated by the reference numerals 53, 54 and 55 and that are respectively disposed at the work stations 47, 48 and 49.

The work station 44 of the apparatus 40 comprises the loading and unloading station wherein the parts 31, 32 and 33 for forming each diaphragm assembly 30 are loaded by an operator into the fixture 42 disposed at that station 44 in the manner illustrated in FIG. 4 and as hereinafter described wherein the end means 34 and 35 of the capillary tube 33 are properly positioned within the connecting parts 36 and 37 of the diaphragm means 31 and the bulb 32 and are held in that position by the fixture means 42 as that particular fixture means 42 is subsequently indexed through the stations 45-51 and then back to the station 44 to be removed therefrom so that a new assembly of the parts 31, 32 and 33 can be loaded into that fixture means 42. Thus, it can be seen that each time the table 41 indexes one increment and then provides a dwell time in the movement thereof, a fixture 42 is brought to the work station 44 to have a completed diaphragm assembly 30 removed therefrom and new parts 31, 32 and 33 of a new diaphragm assembly 30 disposed therein to be subsequently carried through the work stations 45-51 by the indexing table 41.

The work stations 45 and 46 are utilized as verifying stations for verifying that the proper parts 31, 32 and 33 are being carried in the fixture means 42 passing therethrough so that by the time that particular fixture means 42 reaches the work station 47, the devices 53, 54 and 55 will have been properly programmed so that the same will act on the diaphragm assembly 30 being carried by that fixture means 42 as the same progresses through the stations 47, 48 and 49.

The operating device 53 at the station 47 is adapted to apply a suitable flux means at the juncture of the end means 34 of the capillary tube 33 with the connecting means 36 of the diaphragm means 31 to aid in the subsequent soldering or brazing together thereof by the device 55 at the work station 49. However, before the assembly 30 reaches the station 49 for the brazing operation, the particular fixture 42 moves from the station 47 to the station 48 where the device 54 preheats the area between the end means 34 and 35 of the capillary tube 33 and the connecting means 36 and 37 of the diaphragm means 31 and bulb 32 to assist in the subsequent brazing operation that takes place at the station 49 where the device 55 further heats and solders the connecting areas between the end means 34 and 35 of the capillary tube 33 and the diaphragm means 31 and bulb 32 during the dwell time of the table 41 holding the fixture means 42 at the work station 49.

Thereafter, when that particular fixture 42 is indexed to the work station 50, suitable means (not shown) such as air jet means, water jet means and the like can be utilized to cool the brazed assembly 30 and a further cooling thereof can take place at the work station 51 if desired, so that by the time the completed assembly 30 returns back to the work station 44, the completed assembly 30 is sufficiently cool that the operator can remove the completed assembly 30 from the fixture 42 and load new parts 31, 32 and 33 into the fixture 42 to subsequently progress through the work stations 45-51 in the manner previously described.

Figure 6:
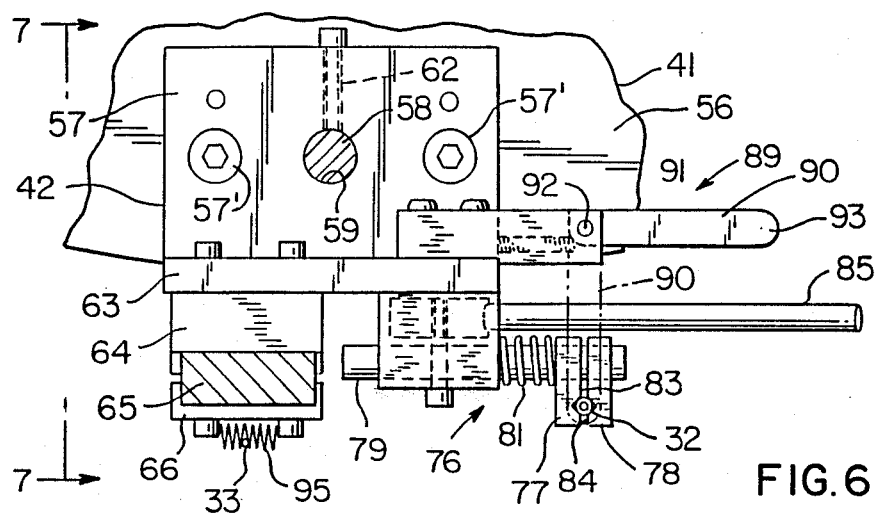
FIG. 6 is a fragmentary cross-sectoional view taken on line 6—6 of FIG. 4.
Figure 7:
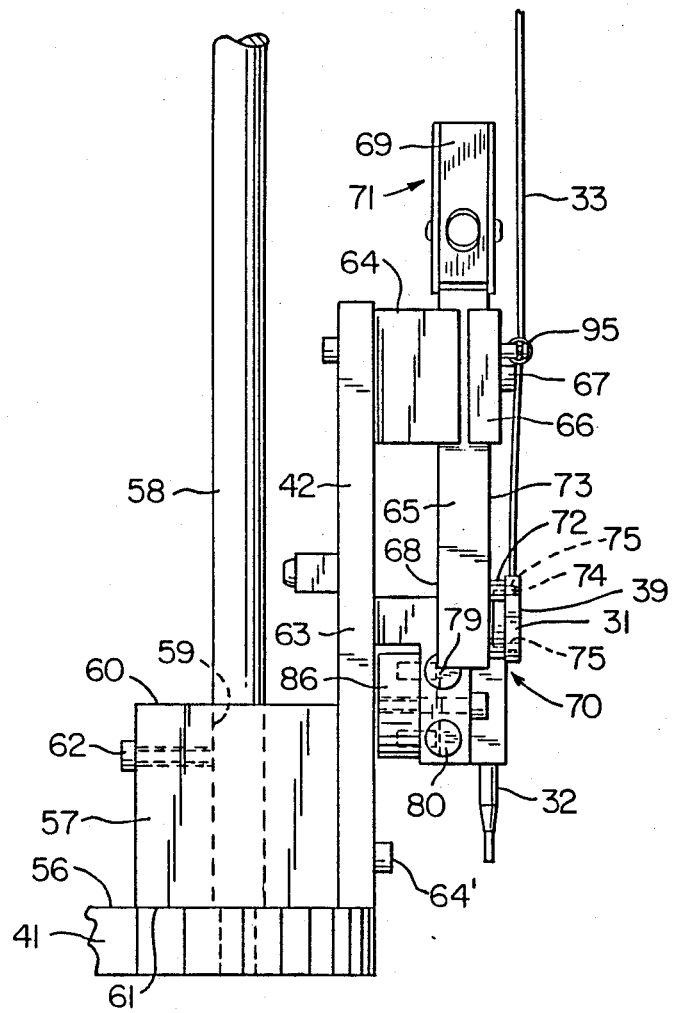
FIG. 7 is a fragmentary cross-sectional view taken in the direction of the arrows 7—7 of FIG. 6.

The rotatable table 41 has an upper surface 56 that is disposed substantially horizontally as illustrated in FIG. 4 and the fixture means 42 as best illustrated in FIGS. 4 and 7 comprises a block means 57 that is fastened to the table 41 in any suitable manner such as by fastening means 57' in FIG. 6, and which carried a rod means 58 that is disposed in an opening 59 passing through opposed sides 60 and 61 of the block means 57 and is adapted to be fixed to the block means 57 by a fastening member 62 in a manner conventional in the art.

The block means 57 carries an upstanding member 63 that is fastened to the block means 57 by suitable fastening means 64' with the member 63 in turn carrying a bracket 64 to which is clamped an elongated member 65 by an outer member 66 fastened to the bracket 64 by suitable fastening means 67. The member 65 has opposed end means 68 and 69 with the end means 68 and 69 respectively providing holding means that are generally indicated by the reference numerals 70 and 71 for respectively holding different types of diaphragm means to the fixture means 42 when assembled thereto and when the particular holding means 70 or 71 is disposed below the other holding means thereof.

Figure 5B:
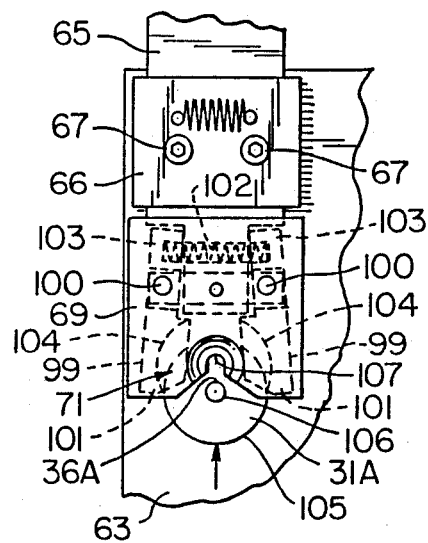
FIG. 5B is a fragmentary view similar to FIG. 5A and illustrates how the diaphragm means is inserted into the holding means of the fixture means of FIG. 5A.
Figure 5A:
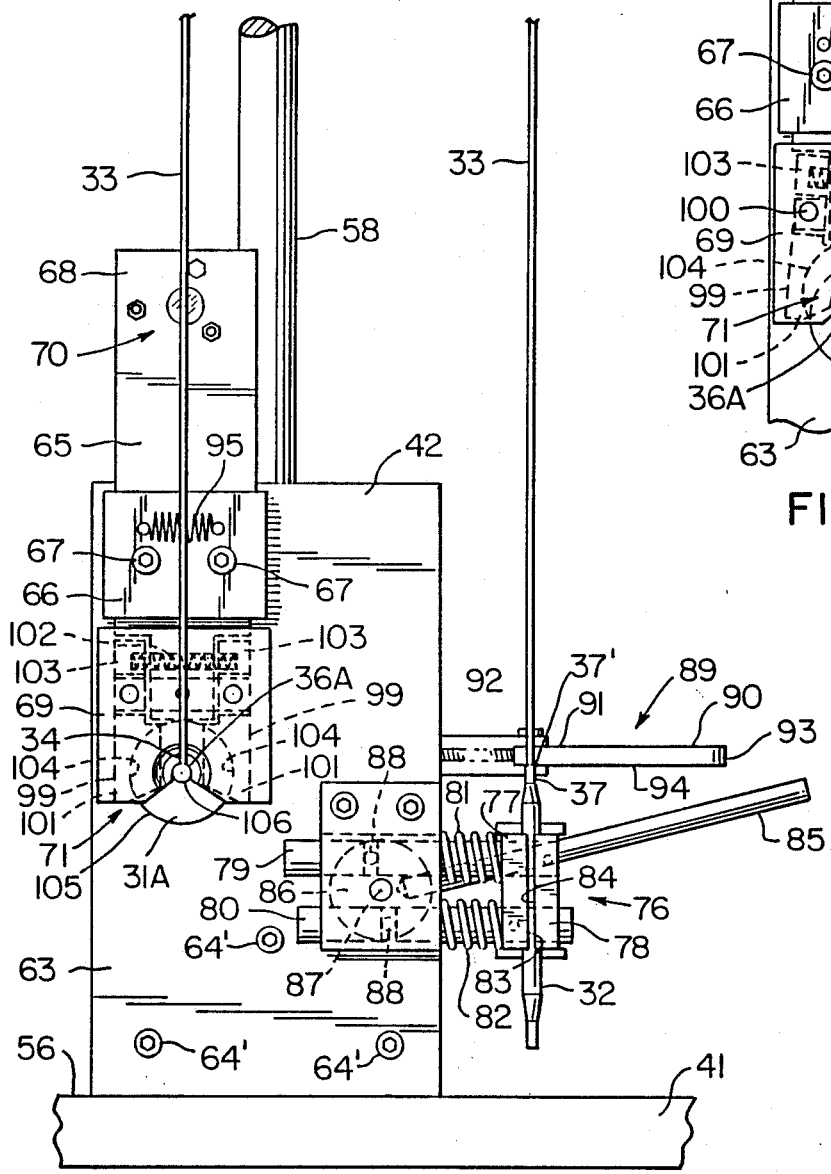
FIG. 5A is a view similar to FIG. 4 and illustrates the apparatus having the holding means of the fixture means thereof disposed in a different position thereof so as to hold the various parts of a different diaphragm assembly means in the assembled relation thereof.

In particular, it can readily be seen in FIG. 4 that the lower holding means 70 of the member 65 is disposed below the holding means 71 and holds the diaphragm means 31 to the fixture 42 whereas when the member 65 is turned around 180 degrees so that the holding means 71 is in the lower position below the holding means 70, the holding means 71 can hold a circular shaped diaphragm means 31A as illustrated in FIGS. 5A and 5B in a manner hereinafter set forth.

The holding means 70 of the member 65 of the fixture 42 comprises a holding magnet M and a plurality of spacers 72 extending outwardly from a surface 73 of the member 65 with extensions 74 extending outwardly beyond the spacers 72 to be received in two of the mounting openings 75 formed in the base surface 39 of the diaphragm means 31 as illustrated in FIGS. 4 and 7 whereby the diaphragm means 31 will be held on the fixture means 42 until the diaphragm means 31 is pulled off of the extensions 74 when desired. In this manner, the movable wall 38 of the diaphragm means 31 faces the surface 73 of the member 65 and is spaced therefrom by the spacer means 72 when the diaphragm means 31 is loaded into the fixture means 42.

Each fixture 42 includes a holding means that is generally indicated by the reference numeral 76 and is utilized for holding the bulb 32 of the assembly for that fixture 42 in a proper position relative to the diaphragm means 31 that is held by the holding means 70, the holding means 76 comprising a pair of blocks 77 and 78 carried on rod means 79 and 80 and being urged together by compression springs 81 and 82 so as to clamp the bulb 32 between facing surfaces 83 and 84 thereof. However, the blocks 77 and 78 are adapted to be spread apart in order to permit insertion and removal of the bulb 32 therebetween by movement of a handle 85 downwardly from the position illustrated in FIG. 4 which causes rotation of a cam member 86 about its axis 87 and through pin means 88 thereof cause opposite movement of the rod means 79 and 80 to permit the blocks 77 and 78 to spread apart in opposition to the force of the springs 81 and 82. Once the bulb 32 has been inserted between the spread apart blocks 77 and 78 to the proper position, the handle 85 can be released and the spring means 81 and 82 will return the blocks 77 and 78 toward each other to clamp and hold the bulb 32 between the facing surfaces 83 and 84 thereof.

In order to insert the bulb 32 between the holding blocks 77 and 78 to a proper position thereof, a positioning means that is generally indicated by the reference numeral 89 in FIG. 4 is provided for each fixture means 42 and comprises a pivotally mounted lever or arm 90 having one end 91 pivoted by pivot means 92 to the fixture 42 and having the other end 93 thereof adapted to be positioned over the space where the bulb 32 will be disposed between the blocks 77 and 78 in the manner illustrated by phantom lines in FIG. 6 and then be returned out of the way to the full line position illustrated in FIGS. 4 and 6 after the same has been utilized to position the bulb 32.

In particular, when it is desired to insert a bulb 32 between the blocks 77 and 78, the positioning arm 90 is disposed in the phantom line position illustrated in FIG. 6 and the handle 85 is moved in a clockwise direction in FIG. 4 to spread the blocks 77 and 78 so that the bulb 32 can be inserted between the blocks 77 and 78 and have its upper end surface 37' abut against the bottom surface 94 of the arm 90 so that its connecting part 37 of the bulb 32 will be disposed in a proper position in the fixture means 42. With the end surface 37' of the bulb 32 engaging the surface 94 of the arm 90, the blocks 77 and 78 are moved back together by the operator to hold the bulb 32 in such inserted position whereby the arm 90 can be moved out of the way to the full line position illustrated in FIG. 6.

Thereafter, the capillary tube 33 is then assembled to the diaphragm means 31 and bulb 32 that have been previously inserted in the holding means 70 and 76 of the fixture means 42 in the manner previously set forth, the end means 34 and 35 of the capillary tube 33 being inserted into the connecting means 36 and 37 of the diaphragm means 31 and bulb 32 as illustrated.

In order to hold the capillary tube 33 in its inserted condition with the diaphragm means 31 and bulb 32, a coil spring 95 is carried by the clamping block 66 of the fixture means 42 so that the capillary tube 33 can be pressed between adjacent coils of the spring 95 to hold the same in a vertical position above the diaphragm means 31.

In addition, the rod 58 of each fixture means 42 carries a bracket-like member 96 over which the capillary tube 33 is adapted to be looped so as to rest on the upper surface 97 thereof, the bracket means 97 being carried by a block system 98 that is adjustable on the rod means 58 in the manner illustrated in FIG. 5 so that different lengths of capillary tubes 33 can be utilized by merely adjusting the position of the bracket 97 on the rod means 58 for each fixture means 42.

From the above, it can readily be seen that the parts 31, 32 and 33 of each diaphragm assembly 30 is adapted to be readily loaded into a fixture means 42 at the work station 44 of the apparatus 40 of this invention and can be readily subsequently removed therefrom after the same has been brazed by the apparatus 40 by opening the blocks 77 and 78 with the handle 85 and snapping the diaphragm means 31 off of the holding extensions 74 of the holding means 70.

With the parts 31, 32 and 33 of the diaphragm assembly 30 loaded in a fixture means 42 of the apparatus 40 in the manner previously set forth, the holding means 71 and 76 together with the positioning means 90 have been so constructed and arranged that the same properly position the connecting portions 36 and 37 of the diaphragm means 31 and the bulb 32 so that the same will be held in the proper positions for the subsequent brazing or soldering operation thereon to secure the end means 34 and 35 of the capillary tube 33 in its assembled relation with the diaphragm means 31 and the bulb 32 as the devices 53, 54 and 55 at the work stations 47, 48 and 49 are arranged to accurately reach the connecting areas 36 and 37 thereof as will be apparent hereinafter.

As previously stated, a different type of diaphragm means 31A can also be held in each fixture means 42 by merely changing the position of the holding member 68 so that the holding means 71 is in the lower position as illustrated in FIGS. 5A and 5B.

The holding means 71 comprises a pair of movable jaws 99 that are pivotally mounted by pivot means 100 and have the ends 101 thereof urged toward each other by a compression spring 102 operating on the other ends 103 of the jaws 99.

In this manner, the jaws 99 have suitably shaped surfaces 104 that will engage against the outer peripheral surface 105 of the circular diaphragm means 31A to clamp against the same in the manner illustrated in FIG. 5A after the diaphragm means 31A has been forced between the jaws 99 to cam the same open in opposition to the force of the spring 102 to be received in the surfaces 104 which are urged toward the diaphragm means 31A by the spring 102 to hold the diaphragm means 31A in the proper position as illustrated in FIG. 5A wherein a diaphragm stud 106 thereof is disposed against a stop surface 107 that properly locates the diaphragm means 31A in the holding means 71. The stud 106 comprises the connecting part 36A of the diaphragm means 31A in which the end means 34 of the capillary tube 33 can be inserted in its assembled relation therewith as illustrated in FIG. 5A.

It can be seen in FIG. 5A that the holding means 76 of each fixture means 42 for the bulb 32 remains the same but that the positions for the connecting means 37 of the bulb 32 and the connecting means 36A for the diaphragm means 31A will always be in the same relation relative to each other and relative to the top surface 56 of the table 41.

Thus, it can be seen that different types of diaphragm assemblies 30 can be provided in the apparatus 40 of this invention with the connecting areas thereof for the capillary tubes being properly held in predetermined positions so that the devices 53, 54 and 55 can operate thereon in an accurate manner.

Figure 8:
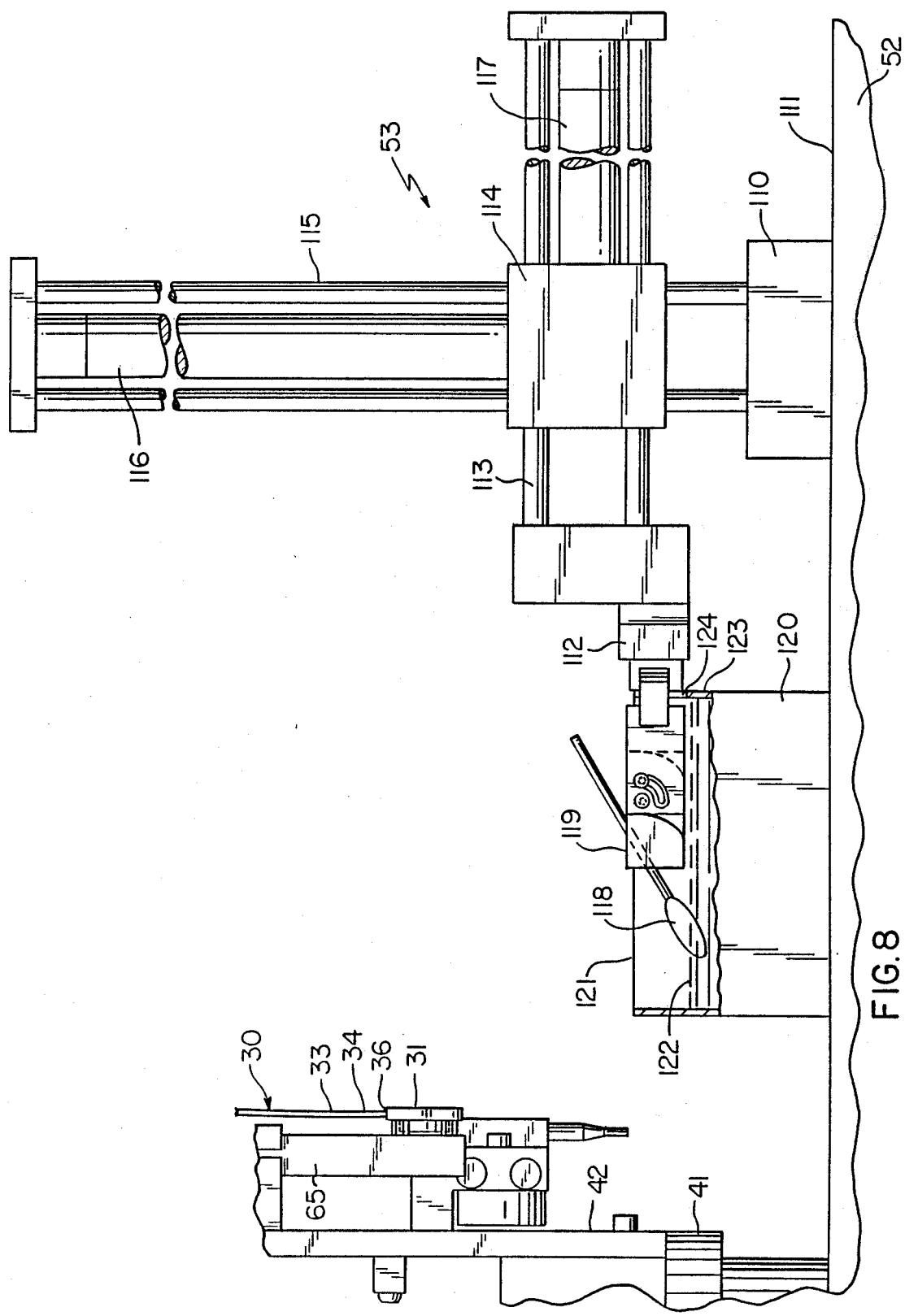
FIG. 8 is an enlarged fragmentary cross-sectional view taken on line 8—8 of FIG. 3 and illustrates the device of that particular work station having disposed the arm means thereof into a container means that contains a flux means therein.
Figure 9:
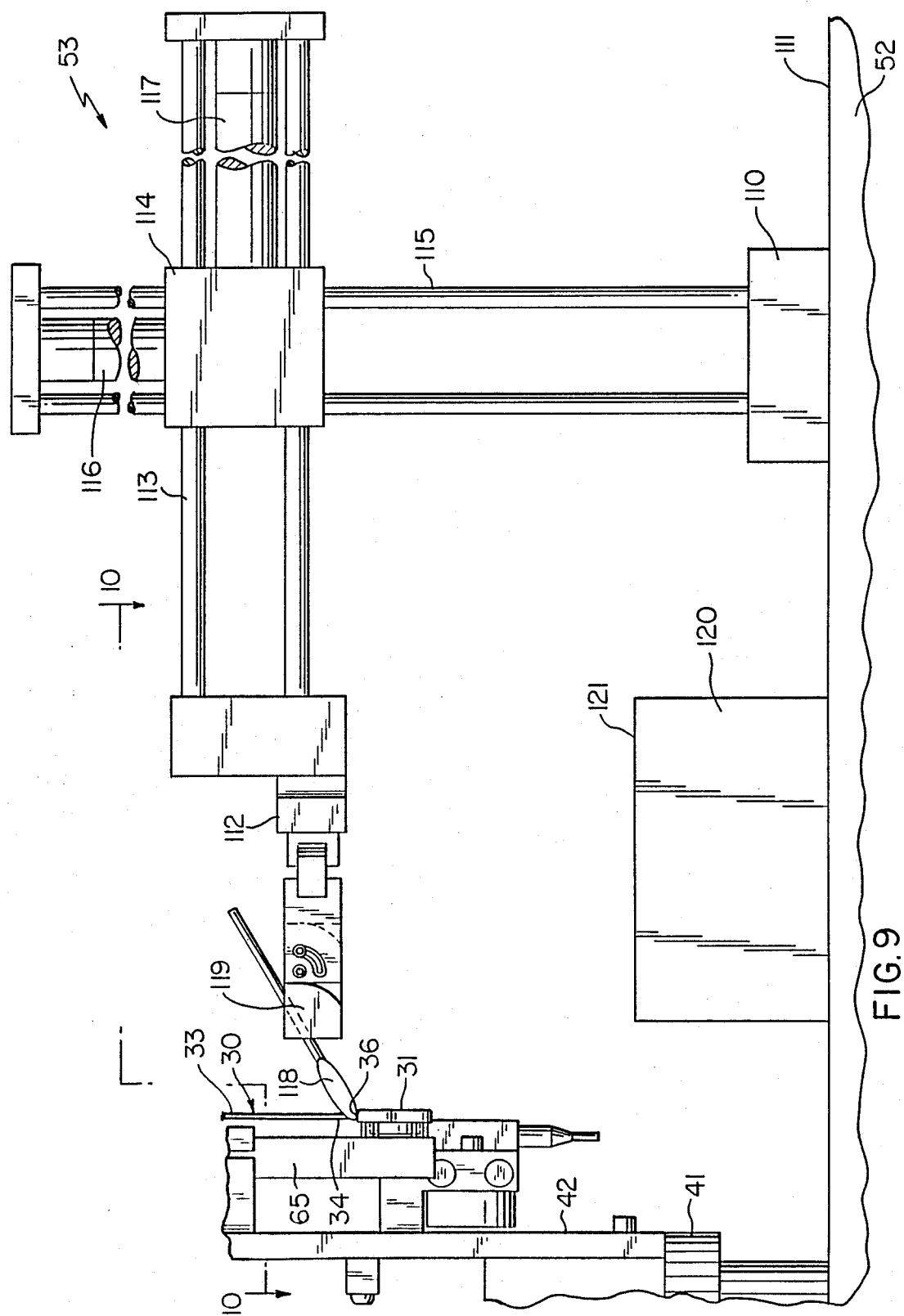
FIG. 9 is a view similar to FIG. 8 and illustrates the arm means applying the flux means to a connecting part of the diaphragm assembly that is being held in the fixture means at that particular work station.
Figure 10:
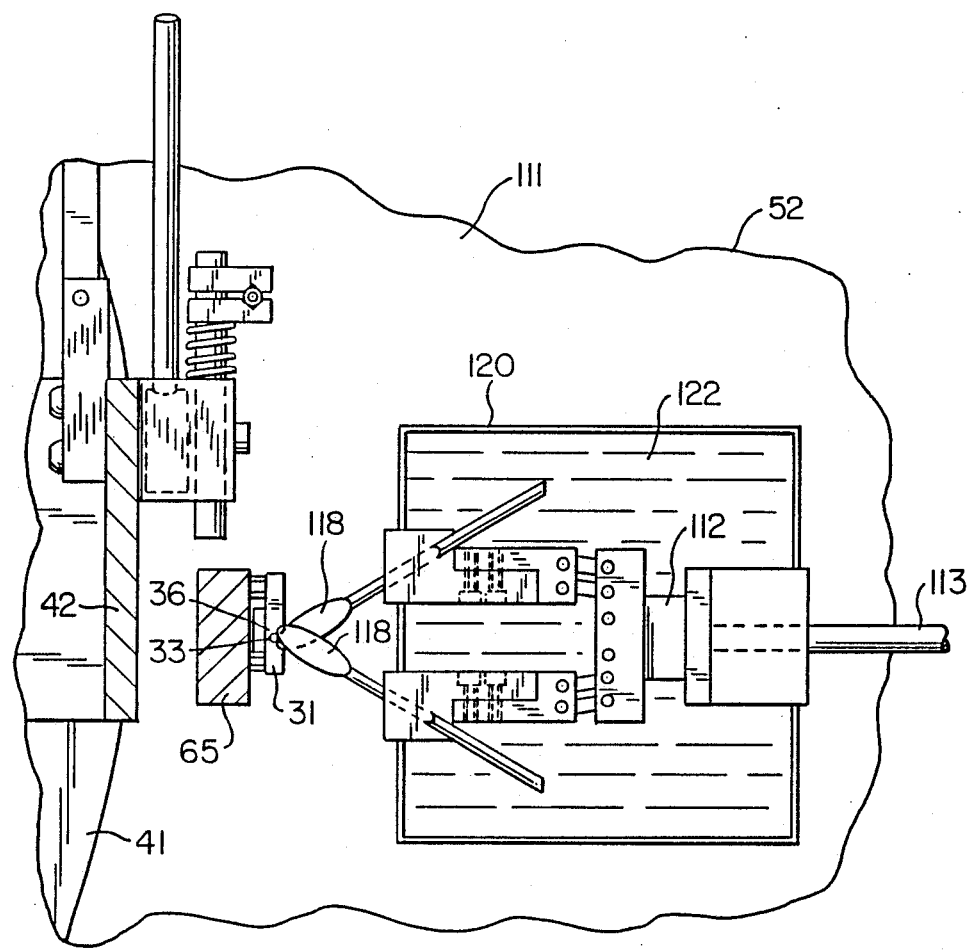
FIG. 10 is a fragmentary cross-sectional view taken on line 10—10 of FIG. 9.

The device 53 at the work station 47 for applying the flux means to the connecting area between the end means 34 of the capillary tube 33 and the connecting means 36 of the diaphragm means 31 or the connecting means 36A of the diaphragm means 31A is best illustrated in FIGS. 8, 9 and 10 and comprises a block 110 fixed to a top surface 111 of the fixed table 52 and carrying a movable arm means 112 that has rod means 113 movably carried by a block 114 that is vertically adjustable on rod means 115 carried by the block 110, the block 114 being adjustable upwardly and downwardly on the rods 115 by a piston and cylinder means 116 while the horizontal position of the arm means 112 is controlled by another piston and cylinder means 117 that positions the rod means 113 relative to the block 114.

Since the operation of fluid operated piston and cylinder means under the control of computer means are well known in the art, further details of the piston and cylinder means 116 and 117 and their operation are deemed unnecessary.

As illustrated in FIGS. 8-10, the arm means 112 of the device 53 carries a pair of flux carrying brush means 118 at the end 119 thereof that are adapted to have solder aiding flux provided thereon and then dispose that flux means onto the connecting area 36 of the diaphragm means 31 at the end means 34 of the assembled capillary tube 33 at the fixture means 42 that is positioned at the work station 47.

In particular, a container means 120 is secured on the surface 111 of the stationary table 52 and has an open upper end 121 and is provided with solder aiding flux therein that is maintained at a predetermined level 122 by any suitable automatic means so that when the brushes 118 are lowered into the open end 121 of the container means 120 a certain amount, the brushes 118 will be disposed below the level 112 a predetermined amount so that sufficient flux will be then carried thereby when the brushes 118 are subsequently moved vertically upwardly from the open end 122 of the container means 120.

Suitable computer means (not shown) control the piston and cylinder means 116 and 117 of the device 53 so that the arm means 112 is adapted to be vertically lowered into the open end 121 of the container means 120 to the proper depth as a rear wall 123 of the container means 120 have a suitable slot 124 therein to permit the arm means 112 to move downwardly to the full line position illustrated in FIG. 8 whereby sufficient flux is applied to the brushes 118 thereof. The arm means 112 is then moved vertically upwardly to a proper position so that the same can then be moved horizontally and in a straight-line manner from an out-of-the-way position thereof to an in position thereof wherein the brushes 118 brush over the end means 34 of the capillary tube 33 at the connecting means 36 of the diaphragm means 31 as illustrated in FIGS. 9 and 10 to apply its carried flux to such connection means 36. Thereafter, the arm means 112 is moved horizontally and in a straight-line manner away from the assembly 30 from its in position thereof to the out position thereof so that the same can be again vertically lowered into the counter means 120 to have new flux applied to the brush means 118 thereof for subsequent being disposed on the diaphragm assembly 30 of the next fixture means 42 that is indexed to the work station 47.

While the device 53 does not also include an arm means for applying flux to the connection means 37 of the bulb 342, it is to be understood that such an arm means could also be provided for applying a flux means to the connection means 37 of the bulb 32 in the same manner as the arm means 112 except that it has been found in the particular applications of the diaphragm assembly 30 of this invention, flux need not be provided for the bulb 32 whereas it is desired to have flux for the connection means 36 of the diaphragm means 31.

The device 54 at the work station 48 of the apparatus 40 of this invention is best illustrated in FIGS. 11–14 and comprises two movable arm means 125 and 126 respectively for preheating the connecting areas 36 and 37 of the diaphragm means 31 and the bulb 32 of the diaphragm assembly 30 when the particular fixture means 42 carrying the same is disposed at the station 48. Thus, since the structure of the device 54 for the arm meams 125 is substantially the same as the structure of the device 54 for the arm means 126, only the mechanism for moving the arms means 125 will now be described with like parts on the means for moving the arm means 126 being given a like reference numeral followed by a prime mark.

Figure 11:
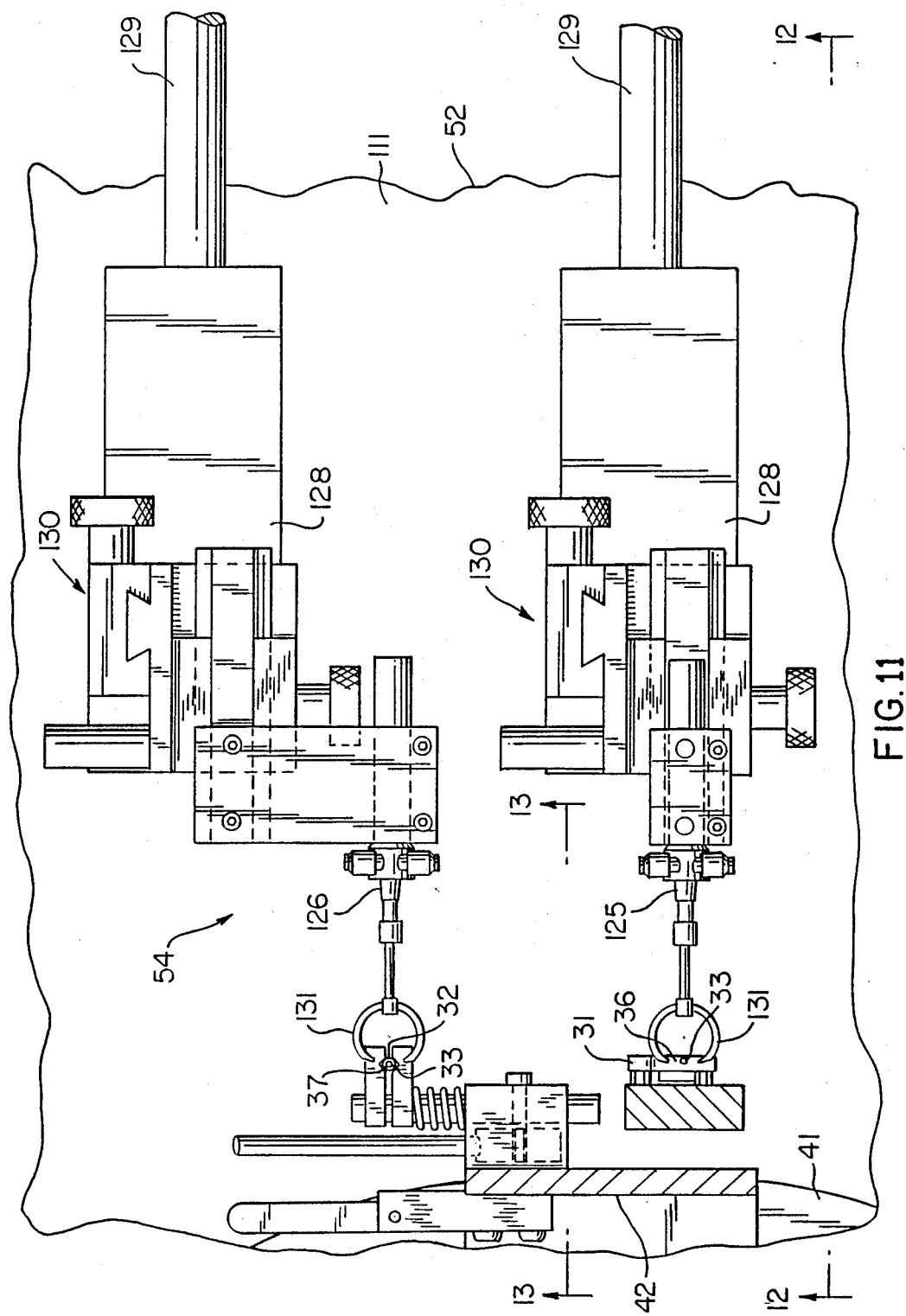
FIG. 11 is an enlarged fragmentary top view of the apparatus of FIG. 3 and illustrates the device for preheating the connecting parts of the diaphragm assembly having the arm means thereof disposed in the preheating position thereof.
Figure 12:
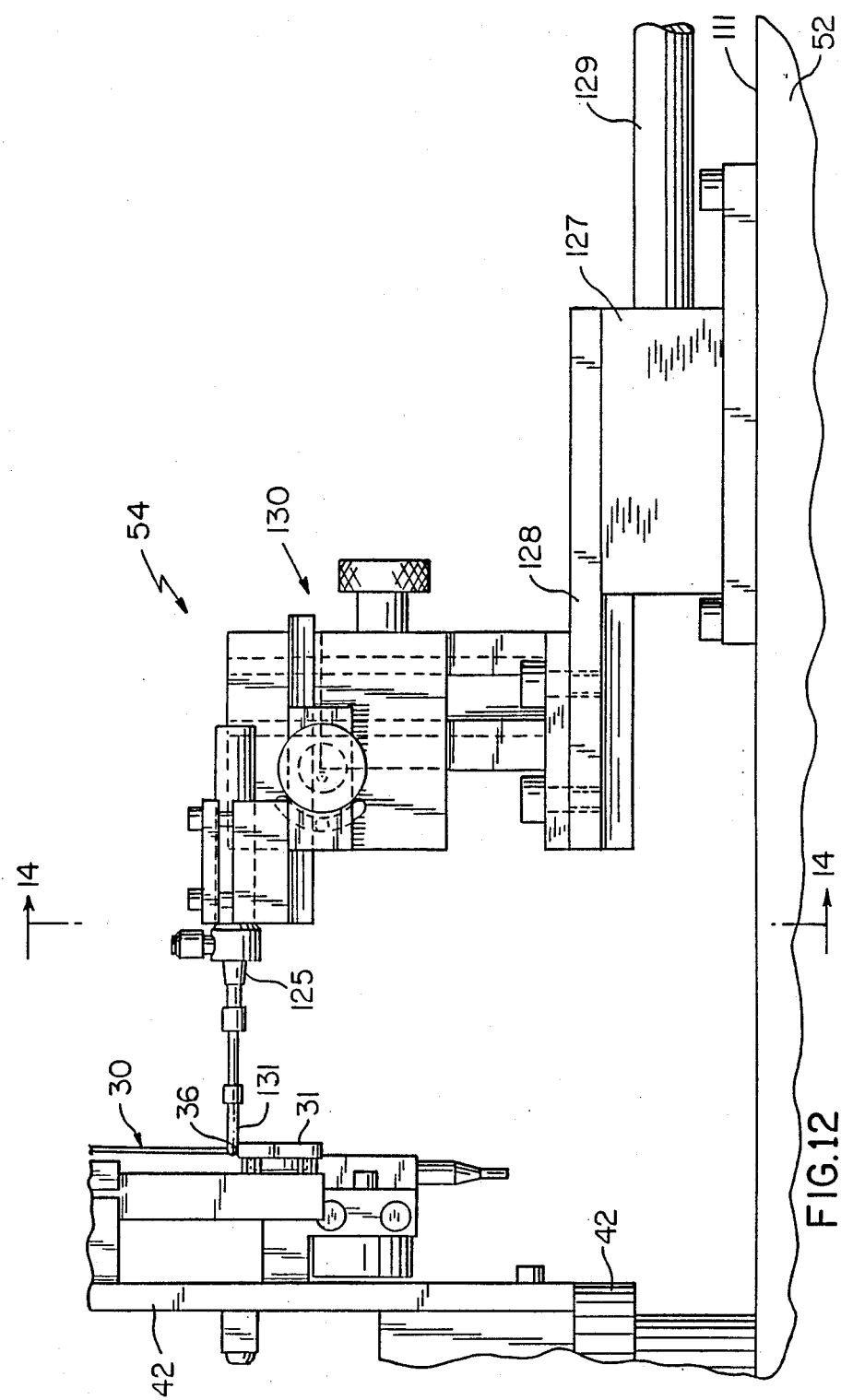
FIG. 12 is a fragmentary cross-sectional view taken on line 12—12 of FIG. 11.
Figure 14:
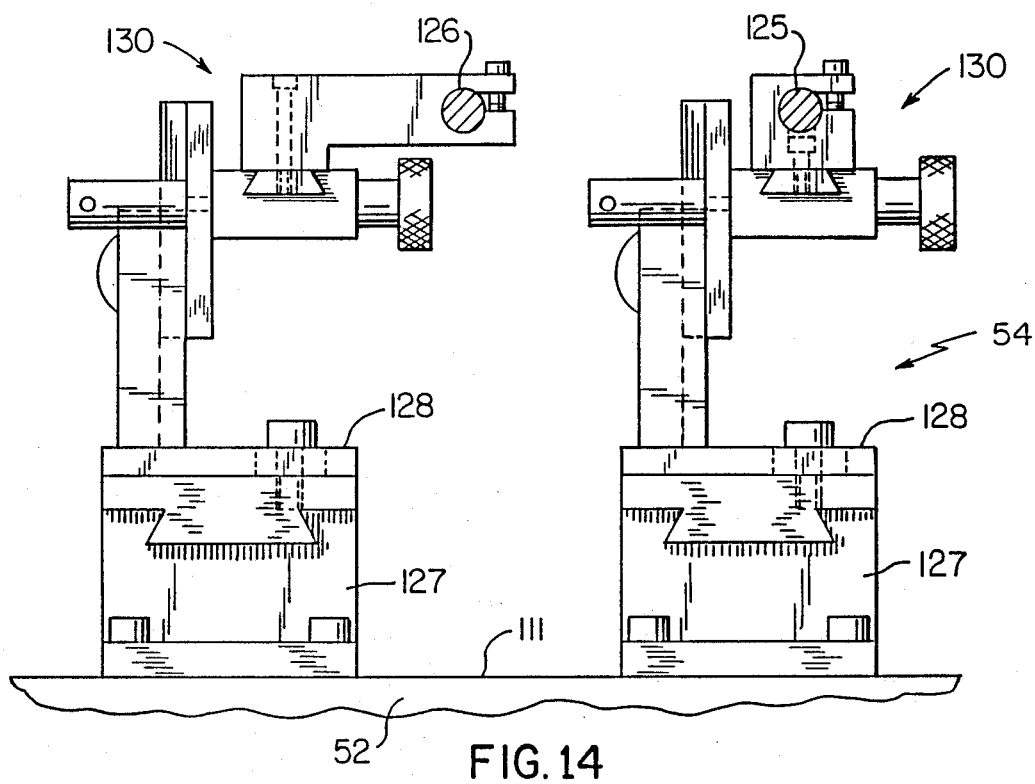
FIG. 14 is a fragmentary cross-sectional view taken on line 14—14 of FIG. 12.
Figure 13:
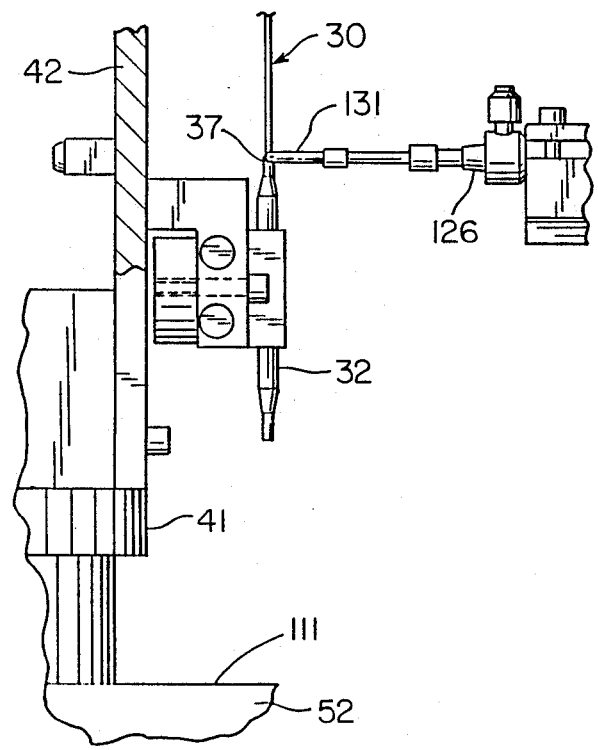
FIG. 13 is a fragmentary cross-sectional view taken on line 13—13 of FIG. 11.

As illustrated in FIGS. 11–14, the device 54 includes a block means 127 fastened to the surface 111 of the stationary table 52 and having a movable block means 128 splined thereto in a dovetailed manner as illustrated in FIG. 14 and being adapted to be movable relative thereto by a piston and cylinder means 129 which is adapted to move the arm means 125 that is carried on the movable block 128 by suitable adjustable structure means 130 from an out-of-the-way position as illustrated in FIG. 3 in a substantially straight-line horizontal manner to the in operation position as illustrated in FIGS. 11, 12 and 13 where an outer end means 131 of the arm means 125 heats the connection means 36 of the diaphragm means 31 by the burning of sufficient gas and oxygen supplied thereto at the end means 131 in a conventional manner to preheat the connection area 36. Thereafter, the arm means 125 is moved in a straight-line manner from the in operating position thereof to the out-of-the-way position thereof as illustrated in FIG. 3 so that the table 41 can then be indexed to bring a new fixture means 42 to the station 48.

Therefore, it can be seen that the device 54 at the work station 48 is adapted to simultaneously move the arm means 125 and 126 from their out-of-the-way position of FIG. 3 in substantially a straight-line manner to exactly the position where the connection means 36 and 37 are located on the fixture means 42 at the station 48 to properly preheat the same for a desired time period while the table 41 is in a dwell period thereof and then be moved back out of the way in a straight-line manner to permit the table 41 to be then indexed to carry that particular fixture means 42 to the station 49 to have the device 55 operate thereon by brazing or soldering the connection areas 36 and 37.

In particular, the device 55 at the work station 49 is best illustrated in FIGS. 15–18 and will now be described.

The device 55 at the work station 49 comprises two like pairs of arm means 132, 133 and 134 and 135 respectively for brazing or soldering the connection means 36 and 37 of the diaphragm means 31 and tube 32 of the diaphragm assembly 30 in the particular fixture means 42 at the station 49.

Since the structure for operating the arm means 132, 133 and 134, 135 is substantially identical, only the structure for operating the arm means 132 and 133 will now be described with parts of the arm means 134 and 135 that are similar to the parts of the operating means for the arm means 132 and 133 being given like reference numerals followed by a prime mark.

Figure 15:
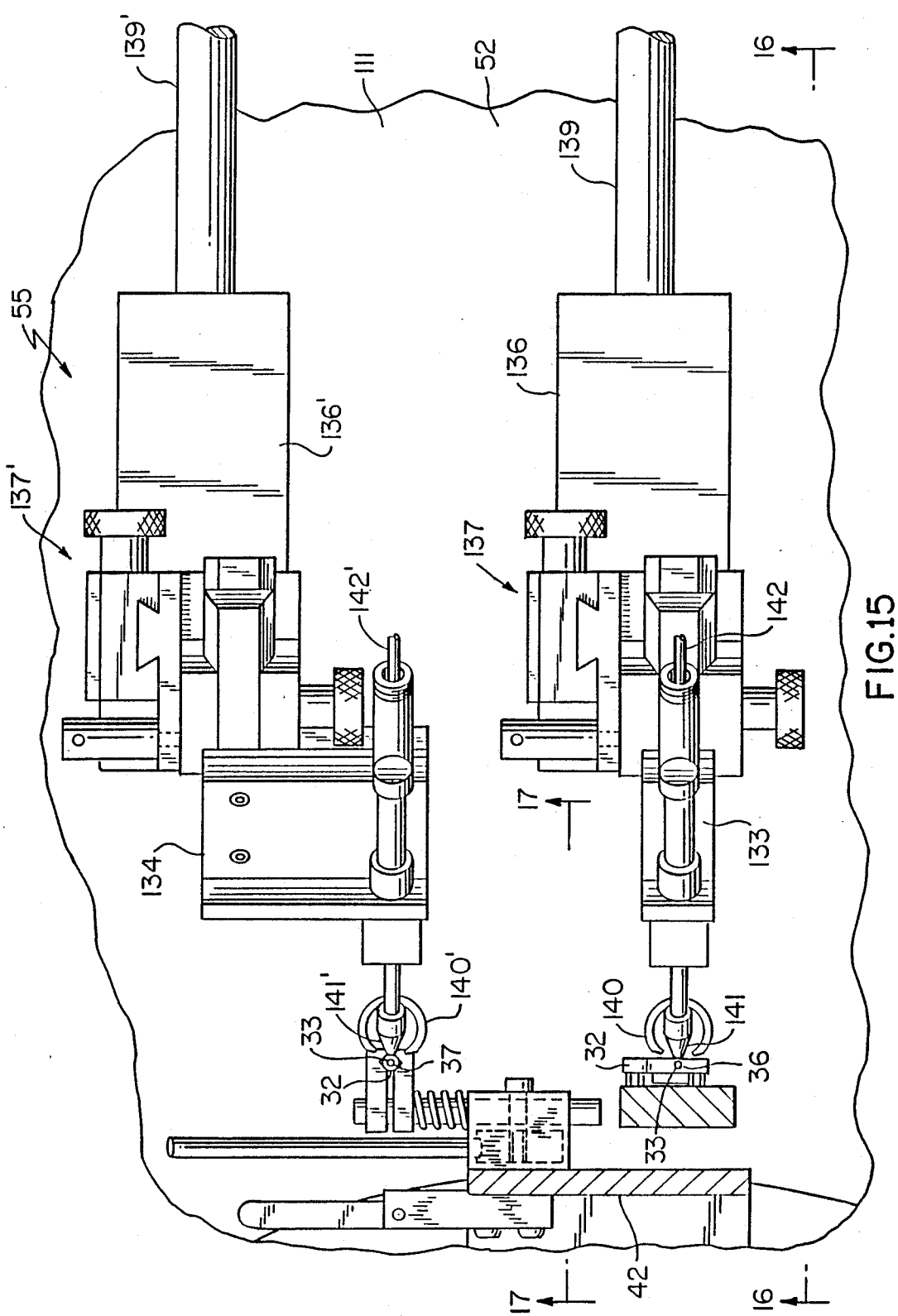
FIG. 15 is an enlarged fragmentary top view of the portion of the apparatus of FIG. 3 that has the brazing device thereon, FIG. 15 illustrating the arm means of the brazing device in the brazing position thereof.
Figure 18:
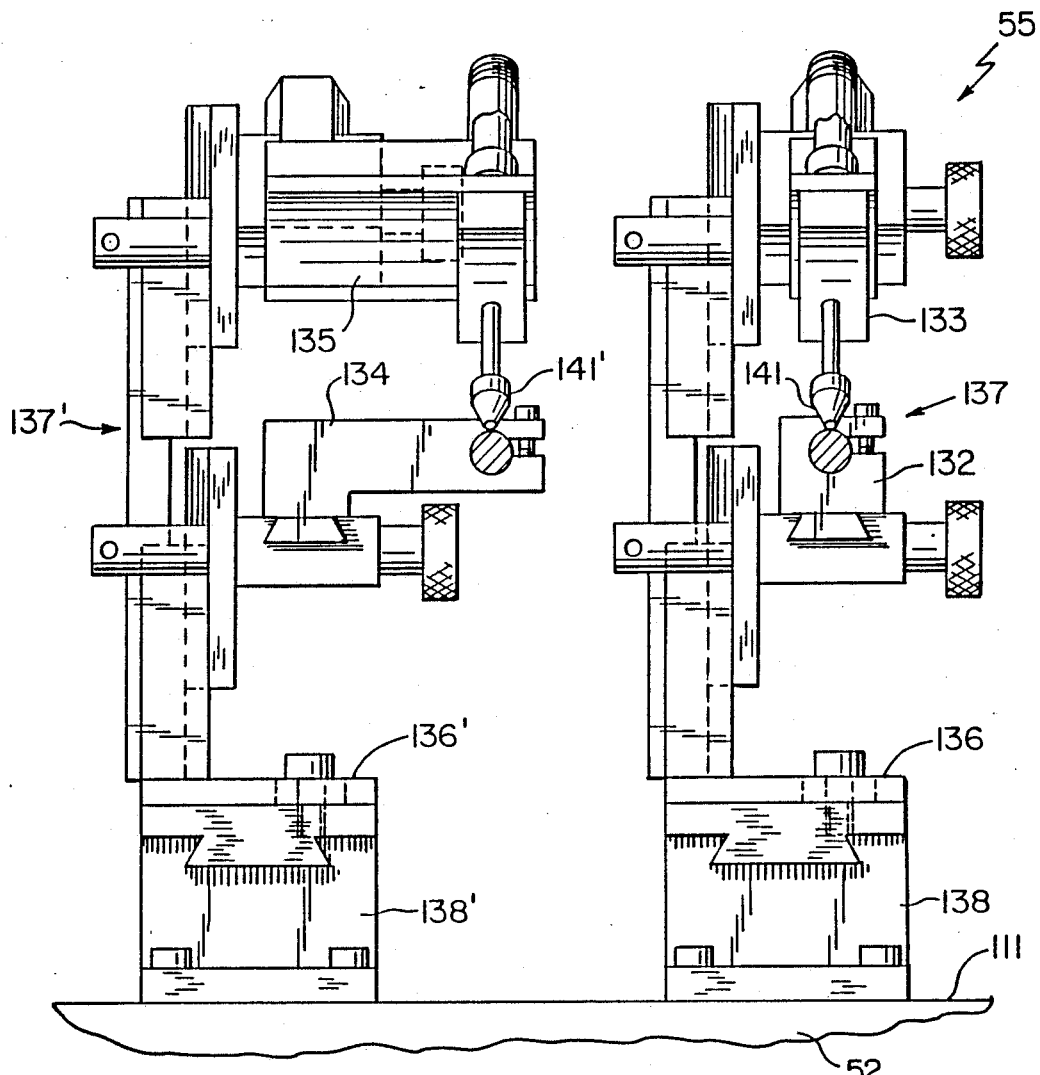
FIG. 18 is a fragmentary cross-sectional view taken on line 18—18 of FIG. 16.

As illustrated in FIGS. 15, 16 and 18, the arm means 132 and 133 are carried on a movable block 136 by adjustable structure that is generally indicated by the reference numeral 137, the block 136 being splined in a dovetail manner for horizontal movement relative to a block 138 fastened to the upper surface 111 of the stationary table 52 so that the block 136 and, thus, the arms 132 and 133 can be moved in a straight-line horizontal manner by a piston and cylinder means 139 interconnected to the block 136.

The arm means 132 has an outer end means 140 which comprises a gas and oxygen supplied heater means in a manner similar to the preheater means 131 previously described while the outer end means 141 of the arm means 133 comprises a means for feeding a length of solder 142, FIG. 16, to the connection means 36 of the diaphragm means 31 in the manner illustrated in FIGS. 15 and 16 when the piston and cylinder means 139 moves the block 136 from the out-of-the-way position of FIG. 3 in a substantially straight-line manner to the in operation position of FIGS. 15 and 16.

Accordingly, it can be seen that the device 55 of the apparatus 40 of this invention is adapted to substantially simultaneously braze or solder the connection means 36 and 37 of the diaphragm means 31 and the bulb 32 at the end means 34 and 35 of the capillary tube 33 of each diaphragm assembly 30 as the same is indexed by the table 41 to the station 49 and during the dwell time of the table 41, the arm means 132, 133 and 134, 135 being moved in a substantially straight-line manner from their out-of-the-way position to their in operating position by the piston and cylinder means 139 and 139' and then being moved back out of the way in a straight-line manner by the piston and cylinder means 139 and 139' so that the table 41 can then index that particular fixture means 42 to the station 50 and bring a new fixture means 42 to the station 49.

From the above, it can be seen that the devices 53, 54 and 55 of the apparatus 40 of this invention can be so adjusted through the various adjustable parts thereof so that the arm means 112, 125 and 126, and 132, 133 and 134, 135 thereof each will be moved in a substantially straight-line manner and in a horizontal plane that is disposed substantially parallel to the plane of the upper surface 56 of the table 41 to exactly the location of the connection means 36 and/or 37 to perform its operating function and then be moved in that same straight-line manner from the in operating position thereof to its out-of-the-way operating position, the devices 53, 54 and 55 performing their operating functions each time the table 41 is in a dwell condition thereof as is well known in the art of indexing fixtures through various work stations. The exact distances of movement of the arm means 112, 125, 126, 132, 133, 134 and 135 are accurately controlled by a computer means controlling the operation of the piston and cylinder devices in a manner well known in the art.

As previously stated, it was found in the prior known apparatus wherein the arms for the various devices were pivotally mounted so that the same moved through an arcuate motion from their out-of-the-way positions to their in positions thereof in arcs that are respectively disposed in planes that are transverse to the plane of the movable table, such arms tended to bounce at their in positions thereof and remain bouncing in a decreasing manner during the operation thereof which prevented accurate operation of the brazing operation in view of the relatively short time required for such function.

However, it has been found according to the teachings of this invention that by utilizing the straight-line horizontal movement of the arm means under the control of the piston and cylinder devices that can be accurately controlled by suitable computer means so as the movement distances thereof are properly controlled, a more accurate brazing operation is provided by the apparatus 40 of this invention.

Therefore, it can be seen that this invention not only provides a new apparatus for automatically brazing the opposed end means of a capillary tube respectively to connecting parts of a bulb and a diaphragm means to form a diaphragm assembly, but also this invention provides a new method of making such an apparatus.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In an apparatus for automatically brazing the opposed end means of a capillary tube respectively to connecting parts of a bulb and a diaphragm means, said apparatus comprising a rotatable table and a plurality of work stations disposed in spaced apart relation about said table and each having an operating device, said table having a plurality of fixture means each being adapted to hold an assembly of said bulb and diaphragm means in a fixed relation relative to each other with its said capillary tube assembled to said connecting parts thereof, each said fixture means having two positions thereof each of which has holding means for holding a different diaphragm means, each said fixture means having an elongated member provided with opposed end means and structure for holding said elongated member, said end means of said elongated member respectively having said holding means thereon, said table having means to index said table through said work stations so that said devices at said work stations can each perform its specific operation on the respective assembly disposed at that particular station during a predetermined dwell time in the movement of said table, said device of one of said stations comprising a movable arm means for applying a flux means to each said assembly, said device of another of said stations comprising a movable arm means for preheating each said assembly in an area thereof that is to be brazed, said device of still another of said stations comprising movable arm means for soldering each said assembly at said connecting parts thereof so that said end means of said capillary tube are respectively brazed to said connecting parts of said bulb and said diaphragm means thereof, each said device having moving means for moving its said arm means thereof from an out position to an in position so as to perform its said operation on the assembly disposed at its respective work station, the improvement wherein said moving means of each said device is adapted to move its respective arm means from its said out position to its said in position in a substantially straight-line manner, each said structure for holding its said elongated member having means intermediate said opposed end means of its said elongated member for holding its said capillary tube as it extends from its said diaphragm means and leads to its said bulb of its said assembly.

2. An apparatus as set forth in claim 1 wherein said table has means for rotating said table through a horizontal plane, said moving means of each said device being adapted to move its respective arm means from its said out position to its said in position in a plane that is disposed substantially parallel to said horizontal plane and in spaced relation relative thereto.

3. An apparatus as set forth in claim 2 wherein each said device has vertically disposed adjusting means for adjusting the vertical position of its said arm means so as to adjust the space between said plane thereof and said horizontal plane.

4. An apparatus as set forth in claim 3 wherein said moving means of each said device comprises a piston and cylinder means.

5. An apparatus as set forth in claim 1 wherein said device of said one station comprises a flux container means, said moving means of said device of said one station being adapted to move said arm means thereof in a manner to obtain flux from said container means before moving said arm means from said out position thereof to said in position thereof.

6. An apparatus as set forth in claim 1 wherein each said means for holding its said capillary tube comprises a coiled spring that receives its said capillary tube between adjacent coils thereof.

7. An apparatus as set forth in claim 6 wherein each said coiled spring has a longitudinal axis that is disposed substantially transverse to its said capillary tube as it is received between its adjacent coils thereof.

8. An apparatus as set forth in claim 1 wherein one of said positions of said fixture means has said elongated member with one of said end means thereof disposed above the other of said end means and wherein the other of said positions of said fixture means has said elongated member with said other end means thereof disposed above said one end means thereof.

9. An apparatus as set forth in claim 1 wherein each said fixture means has positioning means for positioning said connecting part of the bulb of said assembly thereof at a proper position.

10. An apparatus as set forth in claim 9 wherein each said positioning means comprises a pivotally mounted arm.

11. In a method of making an apparatus for automatically brazing the opposed end means of a capillary tube respectively to connecting parts of a bulb and a diaphragm means, said apparatus comprising a rotatable table and a plurality of work stations disposed in spaced apart relation about said table and each having an operating device, said table having a plurality of fixture means each being adapted to hold an assembly of said bulb and diaphragm means in a fixed relation relative to each other with its said capillary tube assembled to said connecting parts thereof, each said fixture means having two positions thereof each of which has holding means for holding a different diaphragm means, each said fixture means having an elongated member provided with opposed end means and structure for holding said elongated member, said end means of said elongated member respectively having said holding means thereon, said table having means to index said table through said work stations so that said devices at said work stations can each perform its specific operation on the respective assembly disposed at that particular station during a predetermined dwell time in the movement of said table, said device of one of said stations comprising a movable arm means for applying a flux means to each said assembly, said device of another of said stations comprising a movable arm means for preheating each said assembly in an area thereof that is to be brazed, said device of still another of said stations comprising movable arm means for soldering each said assembly at said connecting parts thereof so that said end means of said capillary tube are respectively brazed to said connecting parts of said bulb and said diaphragm means thereof, each said device having moving means for moving its said arm means thereof from an out position to an in position so as to perform its said operation on the assembly disposed at its respective work station, the improvement comprising the steps of forming said moving means of each said device to be adapted to move its respective arm means from its said out position to its said in position in a substantially straight-line manner, and forming each said structure for holding its said elongated member to have means intermediate said opposed end means of its said elongated member for holding its said capillary tube as it extends from its said diaphragm means and leads to its said bulb of its said assembly.

12. A method of making an apparatus as set forth in claim 11 wherein said table has means for rotating said table through a horizontal plane and including the step of forming said moving means of each said device to be adapted to move its respective arm means from its said out position to its said in position in a plane that is disposed substantially parallel to said horizontal plane and in spaced relation relative thereto.

13. A method of making an apparatus as set forth in claim 12 and including the step of forming each said device to have vertically disposed adjusting means for adjusting the vertical position of its said arm means so as to adjust the space between said plane thereof and said horizontal plane.

14. A method of making an apparatus as set forth in claim 13 and including the step of forming said moving means of each said device to comprise a piston and cylinder means.

15. A method of making an apparatus as set forth in claim 11 wherein said device of said one station comprises a flux container means and including the step of forming said moving means of said device of said one station to be adapted to move said arm means thereof in a manner to obtain flux from said container means before moving said arm means from said out position thereof to said in position thereof.

16. A method of making an apparatus as set forth in claim 11 and including the step of forming each said means for holding its said capillary tube to comprise a coiled spring that receives its said capillary tube between adjacent coils thereof.

17. A method of making an apparatus as set forth in claim 16 and including the step of forming each said coiled spring to have a longitudinal axis that is disposed substantially transverse to its said capillary tube as it is received between its adjacent coils thereof.

18. A method of making an apparatus as set forth in claim 11 and including the step of causing one of said positions of said fixture means to have said elongated member with one of said end means thereof disposed above the other of said end means and the other of said positions of said fixture means to have said elongated member with said other end means thereof disposed above said one end means thereof.

19. A method of making an apparatus as set forth in claim 11 and including the step of forming each said fixture means to have positioning means for positioning said connecting part of the bulb of said assembly thereof at a proper position.

20. A method of making an apparatus as set forth in claim 19 and including the step of forming each said positioning means to comprise a pivotally mounted arm.

* * * * *